(12) United States Patent
Burka et al.

(10) Patent No.: US 8,473,529 B2
(45) Date of Patent: Jun. 25, 2013

(54) SINGLE PASS MARKING OF FINALIZABLE OBJECTS

(75) Inventors: Peter Wiebe Burka, Ottawa (CA);
Jeffrey Michael Disher, Ottawa (CA);
Daryl James Maier, Unionville (CA);
Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 13/047,781

(22) Filed: Mar. 14, 2011

(65) Prior Publication Data
US 2012/0239710 A1 Sep. 20, 2012

(51) Int. Cl.
*G06F 17/30* (2006.01)

(52) U.S. Cl.
USPC .......................... 707/816; 707/813

(58) Field of Classification Search
USPC .............................. 707/813, 816
See application file for complete search history.

(56) References Cited

U.S. PATENT DOCUMENTS

| | | | |
|---|---|---|---|
| 6,081,665 A | 6/2000 | Nilsen et al. | |
| 6,289,360 B1 | 9/2001 | Kolodner et al. | |
| 6,338,073 B1 | 1/2002 | Houldsworth et al. | |
| 6,393,439 B1 | 5/2002 | Houldsworth et al. | |
| 7,512,745 B2 | 3/2009 | Gschwind et al. | |
| 7,617,264 B1 | 11/2009 | Garthwaite | |
| 7,636,745 B1 | 12/2009 | Detlefs | |
| 7,650,371 B2 | 1/2010 | Duffy et al. | |
| 7,685,182 B2 | 3/2010 | Dussud | |
| 2007/0226282 A1* | 9/2007 | Kwon | 707/206 |
| 2007/0255909 A1* | 11/2007 | Gschwind et al. | 711/147 |
| 2011/0246543 A1* | 10/2011 | Gracie et al. | 707/816 |
| 2012/0066270 A1* | 3/2012 | Kravets | 707/812 |

OTHER PUBLICATIONS

Chen, Michael, et al.; "A Flexible, Efficient Concurrent Garbage Collector for Speculative Thread Processors"; Stanford University Computer Systems Lab Technical Report CSL-TR-03-K01, Dec. 2003.
Barabash, Katherine, et al.; Tracing Garbage Collection on Highly Parallel Platforms'; Proceedings of the 2010 International Symposium on Memory management, Aug. 2010.
Dijkstra, Edsger, et al. "On-the-Fly Garbage Collection: An Exercise in Cooperation," Communications of the ACM Nov. 21, 1978, pp. 966-975.

* cited by examiner

*Primary Examiner* — Neveen Abel Jalil
*Assistant Examiner* — Jagdish Pandya
(74) *Attorney, Agent, or Firm* — Nelson and Nelson; Daniel P. Nelson; Alexis V. Nelson (57) ABSTRACT

An illustrative embodiment of a computer-implemented process for single pass marking of finalizable objects marks strong roots, marks finalizable roots and determines whether a strong work stack is empty. Responsive to a determination the strong work stack is empty the computer-implemented process determines whether a finalizable work stack is empty. Responsive to a determination the finalizable work stack is empty, synchronize threads, the computer-implemented process finalizes finalizable roots and merges mark maps to finish parallel marking.

17 Claims, 7 Drawing Sheets

(Prior Art)

(Prior Art)

SINGLE PASS MARKING OF FINALIZABLE OBJECTS

BACKGROUND

1. Technical Field

This disclosure relates generally to memory management in a data processing system and more specifically to single pass marking of finalizable objects in the data processing system.

2. Description of the Related Art

In a Java® virtual machine (Lindholm and Yellin, "The Java Virtual Machine Specification, 2ed", 1999; Java is a registered trademark of Oracle and/or its affiliates), and in other managed runtimes such as VisualAge® for Smalltalk from IBM® and the .NET framework from Microsoft® (IBM and VisualAge are registered trademarks of IBM in the United States and/or other countries; Microsoft is a registered trademark of Microsoft Corporation in the United States and/or other countries), unreachable objects are reclaimed by a garbage collector. Many languages using garbage collection as a part of memory management, such as Java, Smalltalk and C#, provide support for 'finalizable' objects.

In the Java language a finalizer is process, which performs finalization tasks for an object in contrast with a constructor, which creates and initializes an instance of a Java class. The finalizer is optionally used to perform a cleanup on an instance of the class and to release resources, including file descriptors, previously held by the object when the object is no longer needed. The resources are released for subsequent use by other objects. Instances of classes that implement a finalize method are often called finalizable objects.

When a Java object is no longer needed, the garbage collector in Java typically recycles memory allocated to the object automatically for use by other objects. However when an instance of a class implements a finalize method, the allocated memory is not recycled by the garbage collector immediately because the object is appended to a special queue for the finalization process. After successful completion of the finalization process the object is ready for a next iteration of garbage collection, therefore typically two or more garbage collection cycles are needed to reclaim resources previously held by a finalizable object.

The garbage collector is required to detect when the finalizable objects become unreachable and enqueue the objects for special processing invoking an associated finalize method for the objects. The memory allocated to these objects may not be reclaimed until processing has completed and the object once again becomes unreachable.

Even though the collector has determined finalizable objects are unreachable, the collector must keep the objects alive, along with the closure of objects reachable from the finalizable objects. An introduction to finalization and finalizable-reachable objects (in C#) is provided in an article entitled "Garbage Collection: Automatic Memory Management in the Microsoft .NET Framework," by Jeffrey Richter.

In typical garbage collector implementations, the garbage collector traces all strong roots (for example, system classes, thread stack frames . . . ) and follows all objects directly or indirectly reachable from the traced roots. The garbage collector may mark the objects in a mark map or use another mechanism to indicate an object is strongly reachable. The marking may be done in parallel and/or concurrently.

When all strongly reachable objects have been discovered, the collector processes finalizable objects. The collector walks through a list of finalizable objects. For each finalizable object, the collector determines whether the object has been marked as strongly reachable. When the object has not been marked as strongly reachable, the collector enqueues the object for finalization and marks the object as reachable. When this operation is completed, the collector follows all objects directly or indirectly reachable from the finalizable objects, marking the objects as reachable.

In worst-case scenarios, finalizable objects may retain large graphs of objects, requiring significant time to trace. Tracing of large graphs of objects introduces delays into a portion of the garbage collector which is typically not concurrent or incremental, and may not even be processed in parallel in some implementations.

While a number of known solutions to this problem are available, none are entirely satisfactory. Final tracing of finalizable-reachable objects may be parallelized to take advantage of multiple processing resources (cores) in the machine, for example the Java virtual machine available from IBM uses this solution. In general this technique works, but there may be insufficient workload to fully benefit from parallelization. For example, only a number of the processors may be fully utilized while other processors remain idle.

Final tracing of finalizable-reachable objects may be incrementalized. By breaking the final processing into multiple steps the collector can set a bound for the maximum pause times. However, incrementalizing this step can be difficult, requiring either a snapshot-at-the-beginning write barrier or additional card cleaning phases. The additional operations can increase the overall garbage collection time, although the technique does reduce the maximum pause time. Final tracing of finalizable-reachable objects may also be made concurrent in another variation. The concurrent variation has the same problems as the incremental solution.

A number of solutions have been proposed to reclaim finalizable-reachable objects more quickly, for example Memory Management Method and System by Hiroshi Inoue, and Methods, Apparatus, and Program Products for Improved Finalization by Antonios Printezis and Peter B. Kessler. However the proposed solutions typically do not address the problem of tracing finalizable-reachable objects efficiently. The problem just described can typically be generalized to other types of weakly reachable objects, specifically, in Java; the problem also applies to phantom-reachable objects.

In other previous examples, a technique is described to improve concurrent sweeping when mark bits are stored directly in an object header. In another example, a mechanism is described for detecting popular objects, which may have incoming references. A previous technique describes a distributed garbage collector in which each node uses a work stack and mark map thereby segregating the objects by respective locations. When the collection operation is completed the mark maps are merged.

In yet another example, a garbage collector is described that selects untraced objects, as speculative roots presuming the object might be reachable. When the object is reachable, the speculative mark map is merged with an actual mark map. There is therefore a need for a more efficient garbage collector.

SUMMARY

According to one embodiment, a computer-implemented process for single pass marking of finalizable objects marks strong roots, marks finalizable roots and determines whether a strong work stack is empty. Responsive to a determination the strong work stack is empty the computer-implemented process determines whether a finalizable work stack is empty. Responsive to a determination the finalizable work stack is empty, synchronize threads, the computer-implemented process processes finalizable roots and merges mark maps to finish parallel marking.

According to another embodiment, a computer program product for single pass marking of finalizable objects comprises a computer recordable-type media containing computer executable program code stored thereon. The computer executable program code comprises computer executable program code for marking strong roots, computer executable program code for marking finalizable roots, computer executable program code for determining whether a strong work stack is empty, computer executable program code responsive to a determination the strong work stack is empty, for determining whether a finalizable work stack is empty, computer executable program code responsive to a determination the finalizable work stack is empty, for synchronizing threads, computer executable program code for finalizing finalizable roots, and computer executable program code for merging mark maps to finish parallel marking.

According to another embodiment, an apparatus for single pass marking of finalizable objects comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to mark strong roots, mark finalizable roots, determine whether a strong work stack is empty and responsive to a determination the strong work stack is empty, determines whether a finalizable work stack is empty. Responsive to a determination the finalizable work stack is empty, the processor unit executes the computer executable program code to direct the apparatus to synchronize threads, process finalizable roots and merge mark maps to finish parallel marking.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java is a registered trademark and all Java-based trademarks and logos are trademarks of Oracle and/or its affiliates, in the United States, other countries or both. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
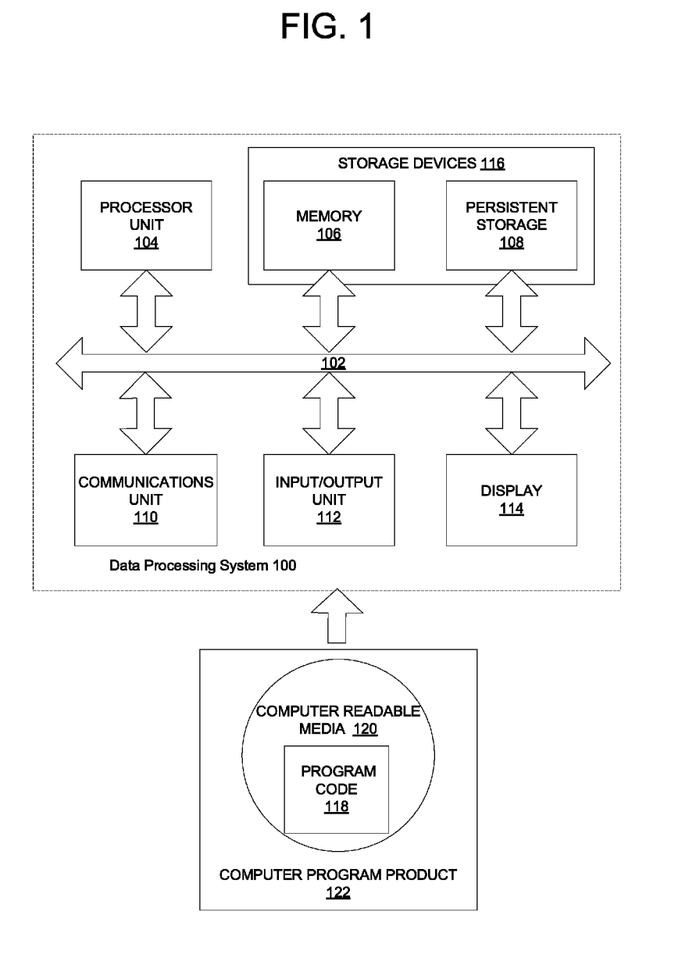
FIG. 1 is a block diagram of an exemplary data processing system operable for various embodiments of the disclosure.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for single pass marking of finalizable objects is presented. The computer-implemented process marks strong roots, marks finalizable roots and determines whether a strong work stack is empty. Responsive to a determination the strong work stack is empty the computer-implemented process determines whether a finalizable work stack is empty. Responsive to a determination the finalizable work stack is empty, the computer-implemented process synchronizes threads, finalizes finalizable roots and merges mark maps to finish parallel marking.

Using data processing system 100 of FIG. 1 as an example, an illustrative embodiment provides the computer-implemented process for single pass marking of finalizable objects stored in memory 106, executed by processor unit 104, marks strong roots, marks finalizable roots and determines whether a strong work stack is empty. Responsive to a determination the strong work stack is empty processor unit 104 determines whether a finalizable work stack is empty. Responsive to a determination the finalizable work stack is empty; processor unit 104 synchronizes threads, finalizes finalizable roots and merges mark maps to finish parallel marking.

In an alternative embodiment, program code 118 containing the computer-implemented process for single pass marking of finalizable objects may be stored within computer readable media 120 as computer program product 122. In another illustrative embodiment, the process for single pass marking of finalizable objects may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
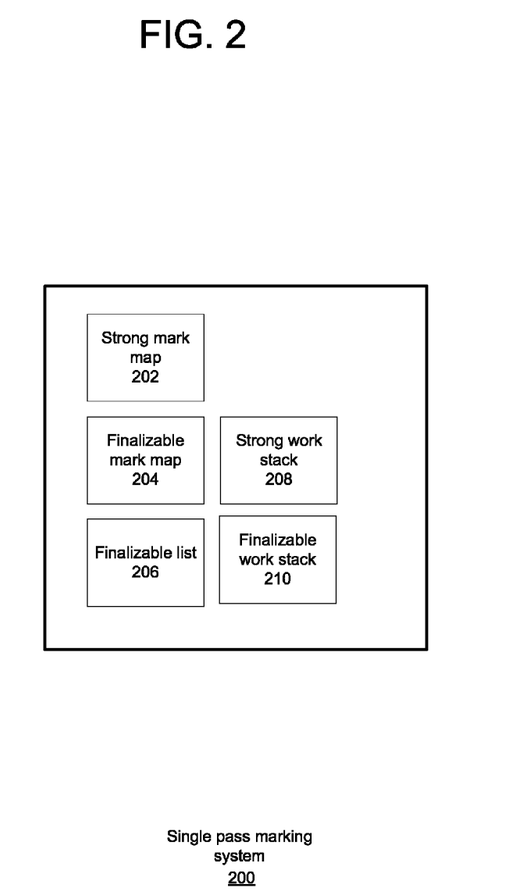
FIG. 2 is a block diagram of components of a single pass marking system, in accordance with various embodiments of the disclosure.

With reference to FIG. 2, a block diagram of components of a single pass marking system, in accordance with various embodiments of the disclosure is presented. Single pass marking system 200 is an example of a single pass marking system.

Single pass marking system 200 comprises a number of components in addition to the components of a conventional data processing system. For example, single pass marking system 200 may be implemented within a conventional data processing system or as an extension of a framework of a conventional data processing system to suit an installation.

Single pass marking system 200 comprises a number of data structure components including strong mark map 202, finalizable mark map 204, finalizable list 206, strong work stack 208 and finalizable work stack 210. The components may be implemented as discrete units or as logical units providing individual functional support.

Strong mark map 202 is a data structure that provides a capability to represent each possible object address on a storage heap as a corresponding bit in the mark map. For example an object in a memory heap determined to be strongly-reachable would be represented by a respective bit being set on in the strong mark map. The strong mark map is cleared at the beginning of single pass marking processing.

Finalizable mark map 204 is a data structure that provides a capability to represent each possible object address on a storage heap as a corresponding bit in the mark map. For example a respective bit being set on in the finalizable mark map would represent an object in a memory heap determined to be a finalizable-reachable object. The finalizable mark map is cleared at the beginning of single pass marking processing.

Finalizable list 206 is a data structure providing a capability to contain entries representative of objects determined to be finalizable objects. Finalizable objects require additional processing using a finalization process, which may be unique to a respective object. An object may be placed on finalizable list 206 after a scanning operation discovers the object and determines the object to be finalizable.

Strong work stack 208 is a data structure providing a capability to represent objects typically determined to be strongly-reachable, but may also be used to contain other information for other objects. Objects identified in the strong work stack are candidates for immediate reclamation processing in a garbage collection cycle.

Finalizable work stack 210 is a data structure providing a capability to represent objects typically determined to be finalizable-reachable. Objects identified in the finalizable work stack are candidates for processing in a garbage collection cycle after objects in the strong work stack have been processed. As stated previously finalizable objects typically require additional processing and are not immediately available for reclamation by a garbage collection cycle.

Figure 3:
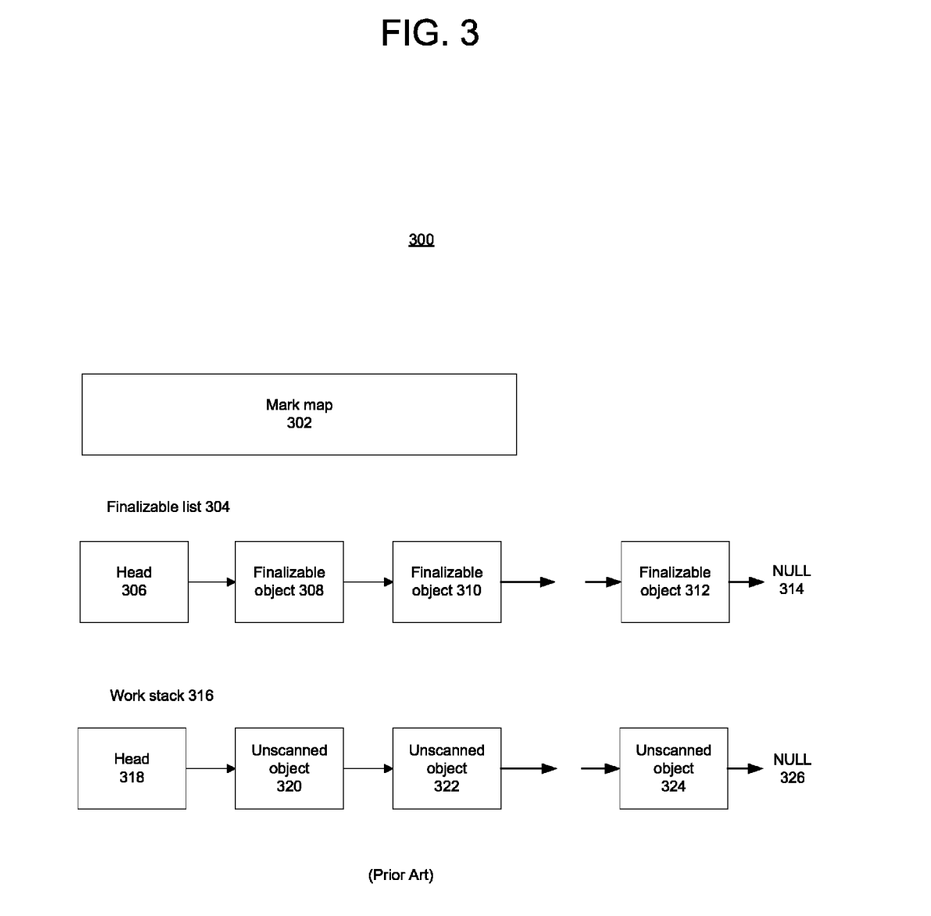
FIG. 3 is a block diagram of data structures used with a conventional marking system.

With reference to FIG. 3 is a block diagram of data structures used with a conventional marking system is presented. Data structures 300 is an example of a set of data structures typically used in a garbage collection process.

Mark map 302 is a data structure containing information indicating whether a live object is reachable and ready for processing by the garbage collecting process. In a typical example, a bit is set on representing a respective object ready for processing.

Finalizable list 304 contains a set of entries representing objects that are determined to be finalizable. For example, the set of entries of finalizable object 308, finalizable object 310, finalizable object 312, bounded by head 306 and NULL 314. Each finalizable object may be processed by a garbage collection routine after processing by a respective finalization method associated with the object.

Work stack 316 contains a set of entries representing objects to be processed and resources reclaimed. For example, the set of entries of unscanned object 320, unscanned object 322, unscanned object 324, bounded by head 318 and NULL 326. Each unscanned object is processed by a garbage collection routine to reclaim memory and other system resources.

Figure 4:
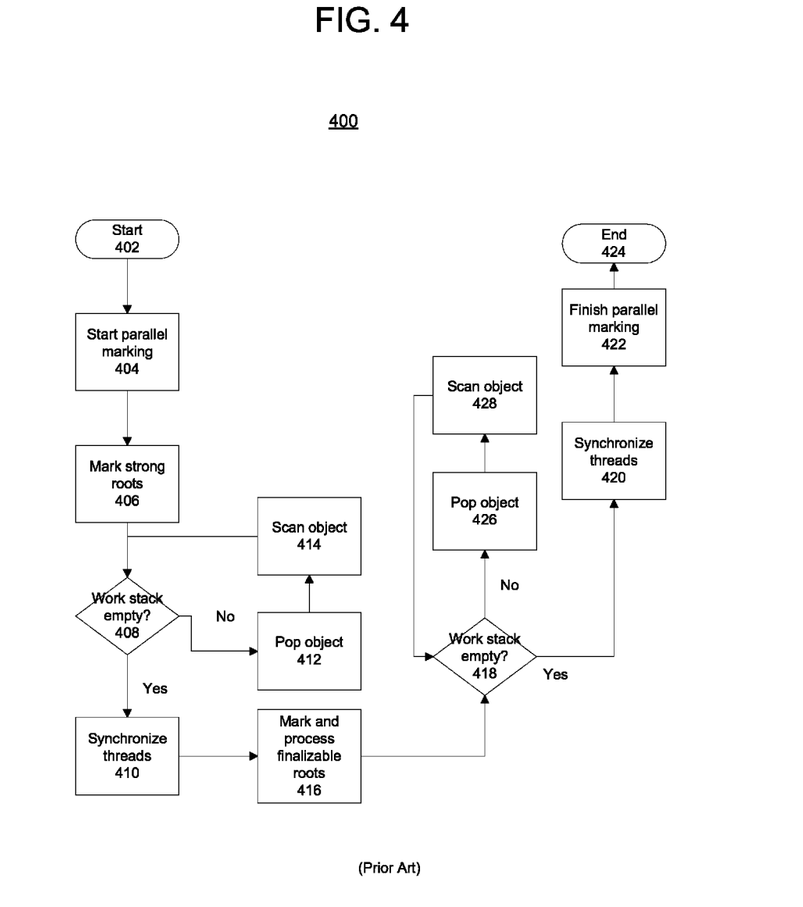
FIG. 4 is a flowchart of a conventional marking process using the marking system of FIG. 3.

With reference to FIG. 4 a flowchart of a conventional marking process using the marking system of FIG. 3 is presented. Process 400 is an example of a typical garbage collection process including finalizable objects.

In a typical garbage collector implementation process 400 starts (step 402) and begins parallel marking (step 404). Process 400 traces all strong roots (for example, system classes, thread stack frames) and follows all objects directly or indirectly reachable from the traced roots. Process 400 marks the strong roots in a data structure (step 406). Process 400 may use a data structure in the form of a mark map or other mechanism to indicate an associated object is strongly reachable. The marking may be done in parallel and/or concurrently. As each object is discovered it is removed from a list of elements of a work stack.

Process 400 determines whether the work stack is empty (step 408). When a determination is made that all strongly reachable objects have not been discovered process 400 pops an object from the work stack (step 412). Process 400 scans the object popped from the work stack (step 414) and returns to perform step 408 as before. When a determination is made that all strongly reachable objects have been discovered, process 400 synchronizes threads (step 410). Process 400 marks and processes finalizable roots (step 416).

Process 400 determines whether the work stack is empty (step 418). When a determination is made that the work stack is not empty process 400 pops an object from the work stack (step 426). Process 400 scans the object popped from the work stack (step 428) and returns to perform step 418 as before. Process 400 walks a list of all finalizable objects. For each finalizable object, process 400 determines whether the object has been marked as strongly reachable. When the object has not been marked as strongly reachable, process 400 enqueues the object for finalization and marks the object as reachable. When process 400 completes processing of finalizable roots, process 400 follows all objects directly or indirectly reachable from the finalizable objects, marking the objects as reachable.

When a determination is made that the work stack is empty process 400 synchronizes threads (step 420). Process 400 finishes parallel marking (step 422) and terminates thereafter (step 424).

Figure 5:
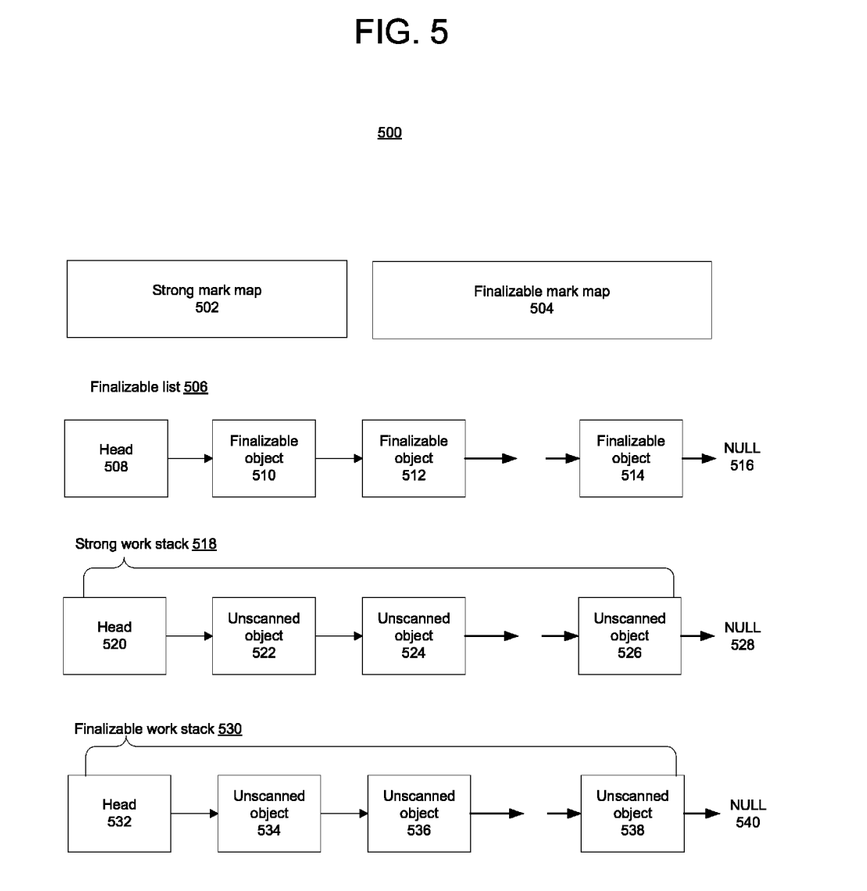
FIG. 5 is a block diagram of data structures used with the single pass marking system of FIG. 2, in accordance with various embodiments of the disclosure.

With reference to FIG. 5 a block diagram of a set of data structures used with the single pass marking system of FIG. 2, in accordance with various embodiments of the disclosure is presented. Data structures 500 is an example of a set of data structures defined in a single pass marking system 200 of FIG. 2 for a garbage collection process.

Strong mark map 502 is a data structure containing information indicating whether a live object is reachable and ready for processing by the garbage collecting process. In a typical example, a bit is set on representing a respective object ready for processing. Finalizable mark map 504 is a data structure containing information indicating whether a respective live object is finalizable-reachable and ready for later processing by the garbage collecting process. In a typical example, a bit is set on representing a respective object is finalizable-reachable.

Finalizable list 506 contains a set of entries representing objects that are determined to be finalizable. For example, head 508 and NULL 516 bound the set of entries of finalizable object 510, finalizable object 512, finalizable object 514. Each finalizable object may be processed by a garbage collection routine after processing by a respective finalization method associated with the object.

Strong work stack 518 contains a set of entries representing objects to be processed and resources reclaimed. For example, the set of entries of unscanned object 522, unscanned object 524, unscanned object 526, are bounded by head 520 and NULL 528. Each unscanned object is processed by a garbage collection routine to reclaim memory and other system resources.

Finalizable work stack 530 contains another set of entries representing objects to be processed and resources reclaimed. For example, the set of entries of unscanned object 534, unscanned object 536, unscanned object 538, are bounded by head 532 and NULL 540. Each unscanned object is processed by a garbage collection routine to reclaim memory and other system resources. The unscanned objects represent finalizable-reachable objects, which are typically not immediately available for reclamation by a garbage collector because a finalization process must first occur for each entry.

Data structures 500 differs from the previous example of data structures 300 of FIG. 3 in that data structures 500 defines additional structures for use with finalizable-reachable objects. Specifically there are additional data structures of finalizable mark map 504 and finalizable work stack 530. The additional data structures associated with finalizable-reachable objects enables more efficient marking by discovering and tracing finalizable-reachable objects earlier through added parallelism during the overall garbage collection process.

Figure 6:
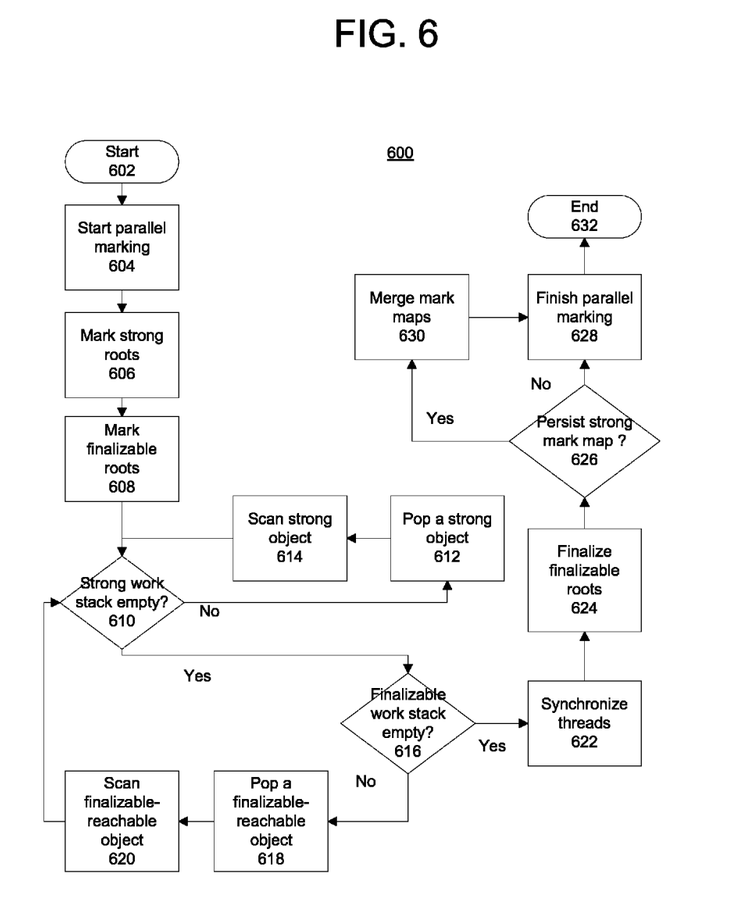
FIG. 6 is a flowchart of a single pass marking process using the data structures of FIG. 5 with the single pass marking system of FIG. 2 in accordance with various embodiments of the disclosure.

With reference to FIG. 6 a flowchart of a single pass marking process using the data structures of FIG. 5 with the single pass marking system of FIG. 2 in accordance with various embodiments of the disclosure is presented. Process 600 is an example of using single pass marking system 200 of FIG. 2 with data structures 500 of FIG. 5.

Process 600 begins (step 602) and starts parallel marking (step 604). Process 600 allocates and updates a mark map designated as a 'strong' mark map (step 606). The mark maps are large enough so that each possible object address in the heap has a corresponding bit in the mark map. The allocation and management of mark maps is well understood in the field of garbage collection is not further described. At the beginning of a mark phase of process 600, both strong and finalizable mark maps are cleared. All strong roots and the list of finalizable objects are traversed by process 600 to find the root set.

Process 600 traverses all strong roots to determine whether each strong root object is marked in the strong mark map. When a determination is made that the strong root object is not marked in the strong mark map process 600 marks the object in the strong mark map and enqueues the object on a list of strong objects to be scanned (the strong work stack).

Process 600 allocates and updates a mark map designated as a 'finalizable' mark map (step 608). For each finalizable object process 600 determines whether the finalizable object is already marked in the strong mark map or the finalizable mark map. When the finalizable object is not already marked in the strong mark map or the finalizable mark map, process 600 marks the finalizable object in the finalizable mark map and enqueues the object on a list of finalizable-reachable objects to be scanned (the finalizable work stack).

Each worker thread process 600 attempts to acquire objects to scan. Threads prefer to scan strongly reachable objects. Each thread of process 600 determines whether the strong work stack is empty (step 610). When a determination is made that the strong work stack is not empty, process 600 removes an object from the list by popping the strongly-reachable object from the strong work stack (step 612). Process 600 scans the strongly-reachable object popped from the strong work stack (step 614). Each object reachable from a scanned strongly-reachable object is checked against the strong mark map and is marked and enqueued when the object is determined to have not been marked.

When a determination is made that the strong stack is empty, process 600 determines whether the finalizable work stack is empty (step 616). When a determination is made that the finalizable work stack is not empty, process 600 removes a finalizable-reachable object from the list by popping the object from the finalizable work stack (step 618). Process 600 scans the finalizable-reachable object popped from the finalizable work stack (step 620). Each object reachable from the scanned finalizable-reachable object is checked against both the strong mark map and the finalizable mark maps. When the object is unmarked in the strong mark map and the finalizable mark map the finalizable-reachable object is marked in the finalizable mark map and enqueued on the finalizable work stack.

Prioritizing scanning of strongly-reachable objects enables process 600 to ensure resources are not wasted updating the finalizable mark map for objects which might be strongly reachable on another, yet to be discovered path. Finalizable-reachable objects are only scanned therefore when there are no strongly-reachable objects to scan. Finalizable scanning, which could potentially be made obsolete by subsequent strong scanning, only occurs during a time when a thread of process 600 would otherwise have been idle.

When a determination is made that the finalizable work stack is empty, process 600 synchronizes threads of the process (step 622). Process 600 traverses objects in the finalizable list to finalize finalizable roots (step 624). For each object in the finalizable list process 600 determines whether the object is marked in the strong mark map. When a determination is made that the object is in the strong mark map, process 600 assumes all objects reachable from the object are also marked in the strong mark map. The object is still strongly reachable and no further processing is required. When the object is not marked in the strong mark map then the object is not strongly reachable. However process 600 can still assume all objects reachable from the object are marked in either the strong mark map or the finalizable mark map (or possibly both). The object is not strongly reachable (it is finalizable-reachable), so the object is enqueued for finalization processing.

A finalizer is process, which performs finalization tasks for an object in contrast with a constructor, which creates and initializes an instance of a Java class. The finalizer is optionally used to perform a cleanup on an instance of the class and to release resources, including file descriptors, previously held by the object when the object is no longer needed. The resources are released for subsequent use by other objects. Instances of classes that implement a finalize method are often called finalizable objects.

When the object is no longer needed, the garbage collector of process 600 typically recycles memory allocated to the object automatically for use by other objects. However when an instance of a class implements a finalize method, the allocated memory is not recycled by the garbage collector immediately because the object is appended to a special queue for the finalization process to finalize finalizable roots. After successful completion of the finalization process the object is ready for a next iteration of garbage collection, therefore typically two or more garbage collection cycles are needed to reclaim resources previously held by a finalizable object.

The garbage collector is required to detect when the finalizable objects become unreachable and enqueue the objects for special finalization processing invoking an associated finalize method for the objects, in this example to finalize finalizable roots. The memory allocated to these objects may not be reclaimed until processing has completed and the object once again becomes unreachable. Each finalizable object is reclaimed by a garbage collection routine after processing by a respective finalization method associated with the object.

Once the finalizable list has been processed using finalization processing a distinction between finalizable-reachable and strongly reachable objects is no longer required. Process 600 finishes parallel marking (step 628) and terminates (step 632).

Process 600 optionally determines whether to persist the strong mark map between garbage collection cycles or for further garbage collection operations (for example, sweeping) (step 626). When a determination is made to persist the strong mark map process 600 merges the strong mark map with the finalizable mark map, setting the strong mark bits for any objects marked in the previous finalizable mark map (step 630). Process 600 proceeds to finish parallel marking (step 628) and terminate thereafter (step 632).

As a variant of disclosed embodiment, data structures 500 of FIG. 5 and process 600 of FIG. 6, the finalizable mark map may be replaced with an equivalent structure, such as a hash table. Objects may be added to the hash table as the objects are marked. In a hash table implementation an implementer may choose to establish a boundary on the maximum size of the hash table, reverting to a traditional, second scanning phase should the size of the table be insufficient. Use of the hash table enables support for the expected case of a small set of finalizable-reachable objects without requiring as much memory as a full mark map.

In another example embodiment, the disclosed process and data structures can be generalized to support additional types of weakly reachable objects, for example, when a Java garbage collector needs to differentiate between strongly reachable objects, finalizable-reachable objects and phantom-reachable objects. Support for this requirement is enabled using additional mark maps (for example, a third, phantom mark map), or additional encodings in a single mark map (for example, a third bit pattern), or a combination of these techniques.

Figure 7:
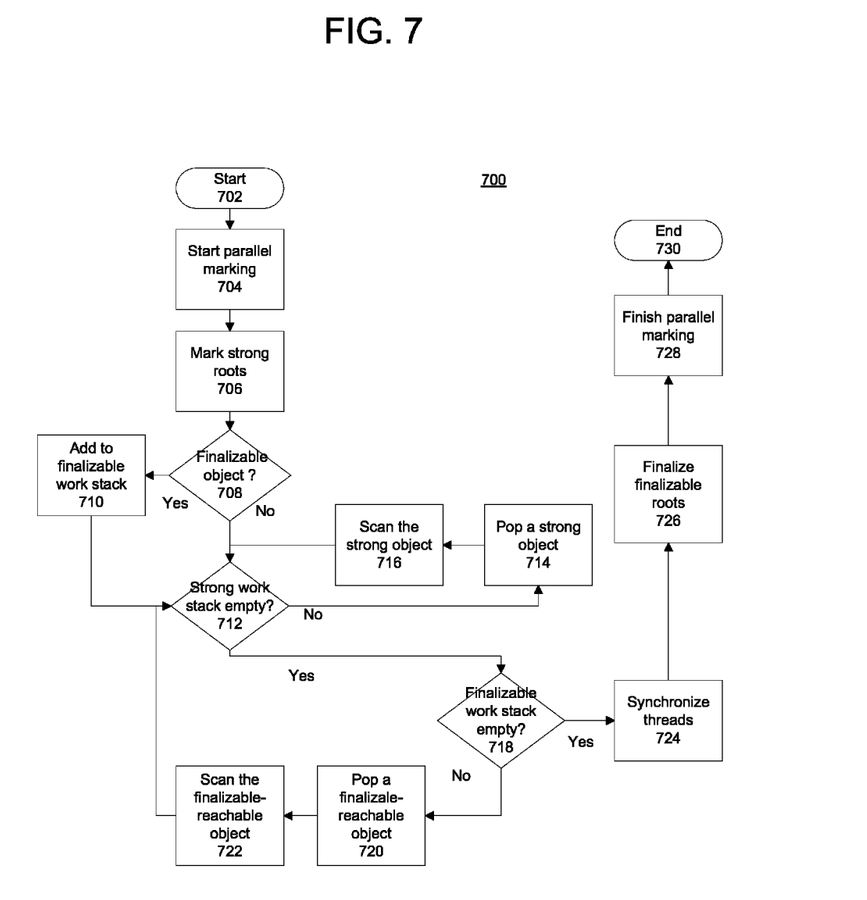
FIG. 7 is a flowchart of a variant of the single pass marking process of FIG. 6, in accordance with various embodiments of the disclosure.

With reference to FIG. 7 a flowchart of a variant of the single pass marking process of FIG. 6, in accordance with various embodiments of the disclosure is presented. Process 700 is an example of a process similar to process 600 of FIG. 6 but depicts an implementation, which does not use a data structure providing a second mark map. For example, when a garbage collector enforces a minimum object alignment of 8 bytes and a minimum object size of 16 bytes, a mark map must have 1 bit for each 8 bytes of heap. Due to the minimum object size, two objects cannot be separated by less than 1 mark bit. Therefore there is no valid heap in which two adjacent mark bits may both be set. This otherwise illegal case of adjacent mark bits (or "double-marked objects") is used to indicate a finalizable reachable object. Following the described example, a number of other encodings can enable implementation of the disclosed process using a single mark map.

Process 700 begins (step 702) and starts parallel marking (step 704). Process 700 allocates and updates a mark map designated as a 'strong' mark map (step 706). The mark maps are large enough so that each possible object address in the heap has a corresponding bit in the mark map. The allocation and management of mark maps is well understood in the field of garbage collection is not further described. At the beginning of a mark phase of process 700, the strong mark map is cleared. All strong roots and the list of finalizable objects are traversed by process 700 to find the root set.

Process 700 traverses all strong roots to determine whether each strong root object is marked in the strong mark map. When a determination is made that the strong root object is not marked in the strong mark map process 700 marks the object in the strong mark map and enqueues the object on a list of strong objects to be scanned (the strong work stack).

Process 700 determines whether the object is a finalizable object using the described illegal case of adjacent mark bits (or "double-marked objects") to indicate a finalizable reachable object (step 708). When a determination is made that the object is a finalizable object process 700 adds the object to the finalizable work stack (step 710). When a determination is made that the object is not a finalizable object process 700 determines whether the strong work stack is empty (step 712).

Each worker thread process 700 attempts to acquire objects to scan. Threads of process 700 prefer to scan strongly reachable objects. When a determination is made that the strong work stack is not empty, process 700 removes an object from the list by popping the object from the strong work stack (step 714). Process 700 scans the strong object popped from the strong work stack (step 716). Each object reachable from a scanned strong object is checked against the strong mark map and is marked and enqueued when the object is determined to have not been marked.

When a determination is made that the strong stack is empty, process 700 determines whether the finalizable work stack is empty (step 718). When a determination is made that the finalizable work stack is not empty, process 700 removes an object from the list by popping the object from the finalizable work stack (step 720). Process 700 scans the finalizable object popped from the finalizable work stack (step 722). Each object reachable from the scanned finalizable object is checked against the strong mark map. When the object is unmarked in the strong mark map the finalizable object is marked in the mark map and enqueued on the finalizable work stack.

Prioritizing scanning of strongly-reachable objects enables process 700 to ensure resources are not wasted updating the finalizable mark map for objects which might be strongly reachable on another, yet to be discovered path. Finalizable-reachable objects are only scanned therefore when there are no strong objects to scan. Finalizable scanning, which could potentially be made obsolete, by subsequent strong scanning only occurs during a time when a thread of process 700 would otherwise have been idle.

When a determination is made that the finalizable work stack is empty, process 700 synchronizes threads of the process (step 724). Process 700 traverses objects in the finalizable list to finalize finalizable roots (step 726). For each object in the finalizable list process 700 determines whether the object is marked in the strong mark map. When a determination is made that the object is in the strong mark map, process 700 assumes all objects reachable from the object are also marked in the strong mark map. The object is still strongly reachable and no further processing is required. When the object is not marked in the strong mark map then the object is not strongly reachable. However process 700 can still assume all objects reachable from the object are marked in the strong mark map. The object is not strongly reachable (it is finalizable-reachable), so the object is enqueued for finalization processing.

The garbage collector is required to detect when the finalizable objects become unreachable and enqueue the objects for special finalization processing invoking an associated finalize method for the objects, in this example to finalize finalizable roots. The memory allocated to these objects may not be reclaimed until processing has completed and the object once again becomes unreachable. Each finalizable object is reclaimed by a garbage collection routine after processing by a respective finalization method associated with the object.

Once the finalizable list has been processed using finalization processing there is no distinction between finalizable-reachable and strongly reachable objects. Process 700 proceeds to finish parallel marking (step 728) and terminate thereafter (step 730).

Thus is presented in an illustrative embodiment a computer-implemented process for single pass marking of finalizable objects marks strong roots, marks finalizable roots and determines whether a strong work stack is empty. Responsive to a determination the strong work stack is empty the computer-implemented process determines whether a finalizable work stack is empty. Responsive to a determination the finalizable work stack is empty, synchronize threads, the computer-implemented process finalizes finalizable roots and determines whether to persist a strong mark map. Responsive to a determination to persist the strong mark map, the computer-implemented process merges mark maps to finish parallel marking.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented process for single pass marking of finalizable objects, the computer-implemented process comprising:
   marking strong roots in a first data structure representing each possible object address on a heap;
   marking finalizable roots in a second data structure representing each possible object address on the heap;
   marking phantom reachable objects in at least one of the first data structure and a phantom mark map;
   providing a strong work stack representing objects determined to be strongly reachable, and a finalizable work stack representing objects determined to be finalizable-reachable;
   determining whether the strong work stack is empty;
   responsive to a determination that the strong work stack is empty, determining whether the finalizable work stack is empty; and
   responsive to a determination that the finalizable work stack is empty, synchronizing threads that are configured to scan objects in the strong work stack and the finalizable work stack, finalizing the finalizable roots, and merging the first and second data structures.

2. The computer-implemented process of claim 1 wherein marking strong roots in a first data structure further comprises:
   creating an entry associated with a strong root in a strong mark map.

3. The computer-implemented process of claim 1 wherein marking finalizable roots in a second data structure further comprises performing one of:
   creating an entry associated with a finalizable root in a finalizable mark map;
   creating an entry representative of a finalizable root in a strong mark map; and
   creating an entry representative of a finalizable root in a hash table.

4. The computer-implemented process of claim 1 further comprising performing the following responsive to a determination that the strong work stack is not empty:
   popping a strongly-reachable object from the strong work stack; and
   scanning the strongly-reachable object, wherein each object that is reachable from the object being scanned and not in a strong mark map is marked in the strong mark map and enqueued in the strong work stack.

5. The computer-implemented process of claim 1 further comprising performing the following responsive to a determination that the finalizable work stack is not empty:
   popping a finalizable-reachable object from the finalizable work stack; and
   scanning the finalizable-reachable object, wherein each object that is reachable from the finalizable-reachable object being scanned and not in a strong mark map and a finalizable mark map is marked in the finalizable mark map and enqueued in the finalizable work stack.

6. The computer-implemented process of claim 1 wherein merging the first and second data structures further comprises:
   determining whether to persist a strong mark map; and
   responsive to a determination to persist the strong mark map, merging the strong mark map with a corresponding finalizable mark map.

7. A computer program product for single pass marking of finalizable objects, the computer program product comprising:
   a computer-readable storage medium storing computer executable program code thereon, the computer executable program code comprising:
   computer executable program code for marking strong roots in a first data structure representing each possible object address on a heap;
   computer executable program code for marking finalizable roots in a second data structure representing each possible object address on the heap;

computer executable program code for marking phantom reachable objects in at least one of the first data structure and a phantom mark map phantom mark man;

computer executable program code for providing a strong work stack representing objects determined to be strongly-reachable, and a finalizable work stack representing objects determined to be finalizable-reachable;

computer executable program code for determining whether the strong work stack is empty;

computer executable program code for, responsive to a determination that the strong work stack is empty, determining whether a finalizable work stack is empty; and computer executable program code for, responsive to a determination that the finalizable work stack is empty, synchronizing threads that are configured to scan objects in the strong work stack and the finalizable work stack, finalizing the finalizable roots, and merging the first and second data structures.

8. The computer program product of claim 7 wherein the computer executable program code for marking strong roots in a first data structure further comprises:

computer executable program code for creating an entry associated with a strong root in a strong mark map.

9. The computer program product of claim 7 wherein the computer executable program code for marking finalizable roots in a second data structure further comprises computer executable program code for performing one of:

creating an entry associated with a finalizable root in a finalizable mark map;

creating an entry representative of a finalizable root in a strong mark map; and creating an entry representative of a finalizable root in a hash table.

10. The computer program product of claim 7 further comprising computer executable program code for, responsive to a determination that the strong work stack is not empty, performing the following:

popping a strongly-reachable object from the strong work stack; and scanning the strongly-reachable object, wherein each object that is reachable from the object being scanned and not in a strong mark map is marked in the strong mark map and enqueued in the strong work stack.

11. The computer program product of claim 7 further comprising computer executable program code for, responsive to a determination that the finalizable work stack is not empty, performing the following:

popping a finalizable-reachable object from the finalizable work stack; and scanning the finalizable-reachable object, wherein each object that is reachable from the finalizable-reachable object being scanned and not in a strong mark map and a finalizable mark map is marked in the finalizable mark map and enqueued in the finalizable work stack.

12. The computer program product of claim 7 wherein the computer executable program code for merging the first and second data structures further comprises:

computer executable program code for determining whether to persist a strong mark map; and computer executable program code for, responsive to a determination to persist the strong mark map, merging the strong mark map with a corresponding finalizable mark map.

13. An apparatus for single pass marking of finalizable objects, the apparatus comprising:

a communications fabric;

a memory connected to the communications fabric and containing computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

mark strong roots in a first data structure representing each possible object address on a heap;

mark finalizable roots in a second data structure representing each possible object address on the heap;

mark phantom reachable objects in at least one of the first data structure and a phantom mark map phantom mark map;

provide a strong work stack representing objects determined to be strongly-reachable, and a finalizable work stack representing objects determined to be finalizable-reachable;

determine whether the strong work stack is empty;

responsive to a determination that the strong work stack is empty, determine whether the finalizable work stack is empty;

responsive to a determination that the finalizable work stack is empty, synchronize threads that are configured to scan objects in the strong work stack and the finalizable work stack, finalize the finalizable roots, and merge the first and second data structures.

14. The apparatus of claim 13 wherein marking strong roots in a first data structure further comprises:

creating an entry associated with a strong root in a strong mark map.

15. The apparatus of claim 13 wherein marking finalizable roots in a second data structure further comprises performing one of:

creating an entry associated with a finalizable root in a finalizable mark map;

creating an entry representative of a finalizable root in a strong mark map; and creating an entry representative of a finalizable root in a hash table.

16. The apparatus of claim 13 further comprising computer executable program code to, responsive to a determination that the strong work stack is not empty, direct the apparatus to:

pop a strongly-reachable object from the strong work stack; and scan the strongly-reachable object, wherein each object that is reachable from the object being scanned and not in a strong mark map is marked in the strong mark map and enqueued in the strong work stack.

17. The apparatus of claim 13 further comprising computer executable program code to, responsive to a determination that the finalizable work stack is not empty, direct the apparatus to:

pop a finalizable-reachable object from the finalizable work stack; and scan the finalizable-reachable object, wherein each object that is reachable from the finalizable-reachable object being scanned and not in a strong mark map and a finalizable mark map is marked in the finalizable mark map and enqueued in the finalizable work stack.

* * * * *